(12) United States Patent
Jouaux et al.

(10) Patent No.: US 9,544,721 B2
(45) Date of Patent: Jan. 10, 2017

(54) ADDRESS POINT DATA MINING

(71) Applicant: Apple Inc., Cupertino, CA (US)

(72) Inventors: Francois M. Jouaux, Woodside, CA (US); Guy L. Tribble, Hillsborough, CA (US); Rama Krishna Chitta, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 13/952,494

(22) Filed: Jul. 26, 2013

(65) Prior Publication Data

US 2015/0031397 A1     Jan. 29, 2015

(51) Int. Cl.
*H04W 4/02*           (2009.01)
*G01C 21/00*       (2006.01)
*G01S 5/02*         (2010.01)

(52) U.S. Cl.
CPC ............ *H04W 4/02* (2013.01); *G01C 21/00* (2013.01); *G01S 5/02* (2013.01)

(58) Field of Classification Search
CPC . G01C 21/32; G01C 21/3667; G01C 21/3679; H04W 24/00; H04W 4/006; H04W 4/028; H04W 4/02; H04W 64/00; H04W 40/20; H04W 8/20; H04W 8/205; H04W 8/24; G06F 17/30241; G06F 17/30616; G06F 17/3087; G06F 17/30041; G06F 17/6254; H04M 3/42348; H04M 2242/30; G06T 7/004; H04L 67/18; H04L 67/609
USPC ... 455/456.1–457, 423, 404.2; 701/408–409, 426, 461, 468, 532; 345/606–610; 379/201.006; 382/113, 103, 382/201, 293, 294
See application file for complete search history.

(56) References Cited

U.S. PATENT DOCUMENTS

| | | | |
|---|---|---|---|
| 6,138,026 A * | 10/2000 | Irvin .......................... | 455/456.3 |
| 8,577,332 B1 * | 11/2013 | Quint et al. .................. | 455/406 |
| 9,076,009 B2 | 7/2015 | Sathish et al. | |
| 9,267,805 B2 | 2/2016 | Marti et al. | |
| 2007/0149214 A1 * | 6/2007 | Walsh et al. ............... | 455/456.1 |
| 2007/0191029 A1 * | 8/2007 | Zarem et al. ............... | 455/456.5 |

(Continued)

FOREIGN PATENT DOCUMENTS

EP      2 284 768      2/2011

OTHER PUBLICATIONS

Daniel Kelly et al: "Uncovering Measurements of Social and Demographic Behavior From Smartphone Location Data", IEEETransactions on Human-Machine Systems, IEEE, Piscataway, NJ, USA, vol. 43, No. 2, Mar. 2013, pp. 188-198, XP011493864, ISSN: 2168-2291, DOI: 10.1109ArSMC. 2013.2238926.

*Primary Examiner* — George Eng
*Assistant Examiner* — Umair Ahsan
(74) *Attorney, Agent, or Firm* — Fish & Richardson P.C.

(57) ABSTRACT

Techniques for address point data mining are described. An address point data mining method, system, or program product can determine geographic coordinates of an address based on geographic locations of one or more user devices. Each user device can be a mobile device operable to determine a location using a global navigation system (e.g., GPS), wireless signal triangulation, or other techniques. During the course of a time period (e.g., a day or week), the user device can stay at a location for a significant amount of time. The system can crosscheck this location with a geocoded geographic coordinates of a registered address (e.g., a billing address) that is associated with the mobile device. The system can determine whether the geocoded geographic coordinates are accurate based on result of the crosscheck.

27 Claims, 11 Drawing Sheets

(56) References Cited

U.S. PATENT DOCUMENTS

| | | |
|---|---|---|
| 2008/0255758 A1* | 10/2008 | Graham et al. .............. 701/209 |
| 2010/0183134 A1* | 7/2010 | Vendrow et al. ........ 379/201.06 |
| 2010/0225447 A1 | 9/2010 | Adra |
| 2010/0287178 A1* | 11/2010 | Lambert et al. .............. 707/765 |
| 2011/0029465 A1 | 2/2011 | Ito et al. |
| 2011/0046881 A1 | 2/2011 | Karaoguz |
| 2011/0070863 A1 | 3/2011 | Ma et al. |
| 2011/0072020 A1* | 3/2011 | Ngo et al. .................... 707/739 |
| 2011/0137834 A1 | 6/2011 | Ide et al. |
| 2011/0313956 A1 | 12/2011 | Abe et al. |
| 2012/0108259 A1 | 5/2012 | Weiss |
| 2012/0122407 A1 | 5/2012 | Alpress et al. |
| 2012/0182933 A1 | 7/2012 | Bandhakavi et al. |
| 2014/0364149 A1 | 12/2014 | Marti et al. |
| 2014/0364150 A1 | 12/2014 | Marti et al. |

* cited by examiner

US 9,544,721 B2

1

ADDRESS POINT DATA MINING

CROSS-REFERENCE TO RELATED APPLICATIONS

This application is related to co-pending U.S. Provisional Application Ser. No. 61/832,741, entitled "Predictive User Assistance," filed on Jun. 7, 2013, the entire contents of which are incorporated herein by reference.

TECHNICAL FIELD

This disclosure relates generally to location-based services.

BACKGROUND

An online map service can provide virtual maps to one or more user devices. The virtual maps can include land features (e.g., houses, office buildings, or shops). The land features can be positioned along a street in a virtual map based on their locations. To display a land feature in the virtual map, the online map service can determine a location (e.g., latitude and longitude coordinates) of the land feature by geocoding an address (e.g., a street address) of the land feature. An exemplary technique of geocoding is address interpolation. In address interpolation, the online map service can determine geographic coordinates of a street using publicly available data, determine a segment of the street (e.g., a block) using cross street information, determine a number of addresses in the segment (e.g., N street numbers) in the segment, and interpolate the geographic coordinates of each address based on geographic coordinates of the segment and the number of addresses in the segment.

SUMMARY

Techniques for address point data mining are described. An address point data mining method, system, or program product can determine geographic coordinates of an address based on geographic locations of one or more user devices. Each user device can be a mobile device operable to determine a location using a global navigation system (e.g., GPS), wireless signal triangulation, or other techniques. During the course of a time period (e.g., a day or week), the user device can stay at a location for a significant amount of time. The system can crosscheck this location with a geocoded geographic coordinates of a registered address (e.g., a billing address) that is associated with the mobile device. The system can determine whether the geocoded geographic coordinates are accurate based on result of the crosscheck.

The features described in this specification can be implemented to achieve one or more advantages. For example, compared to a conventional geocoding system, an address point data mining system can provide more accurate geographic coordinates of an address. Geographic coordinates obtained through address interpolation can be verified and filtered, such that distortion in address interpolation caused by uneven geographic features (e.g., a large building among multiple small houses) can be eliminated or reduced.

The features described in this specification can be implemented to maximize privacy protection of users. In some implementations, most, if not all, operations of address point data mining can be performed by a user device. In implementations where the operations are performed by a server, the server needs no more information from the user than the account information that the user has already provided to the

2 server (e.g., a registered account). The server can send a geocoded address to the user device, and the user device can return a confirmation that the geocoded coordinates of the address are correct or not. In addition, the address can be hashed. Accordingly, the server does not need to store information about a user or a device other than the information already provided by a user.

The details of one or more implementations of address point data mining are set forth in the accompanying drawings and the description below. Other features, aspects, and advantages of address point data mining will become apparent from the description, the drawings, and the claims.

BRIEF DESCRIPTION OF THE DRAWINGS

Like reference symbols in the various drawings indicate like elements.

DETAILED DESCRIPTION

Exemplary Address Point Data Mining

Figure 1:
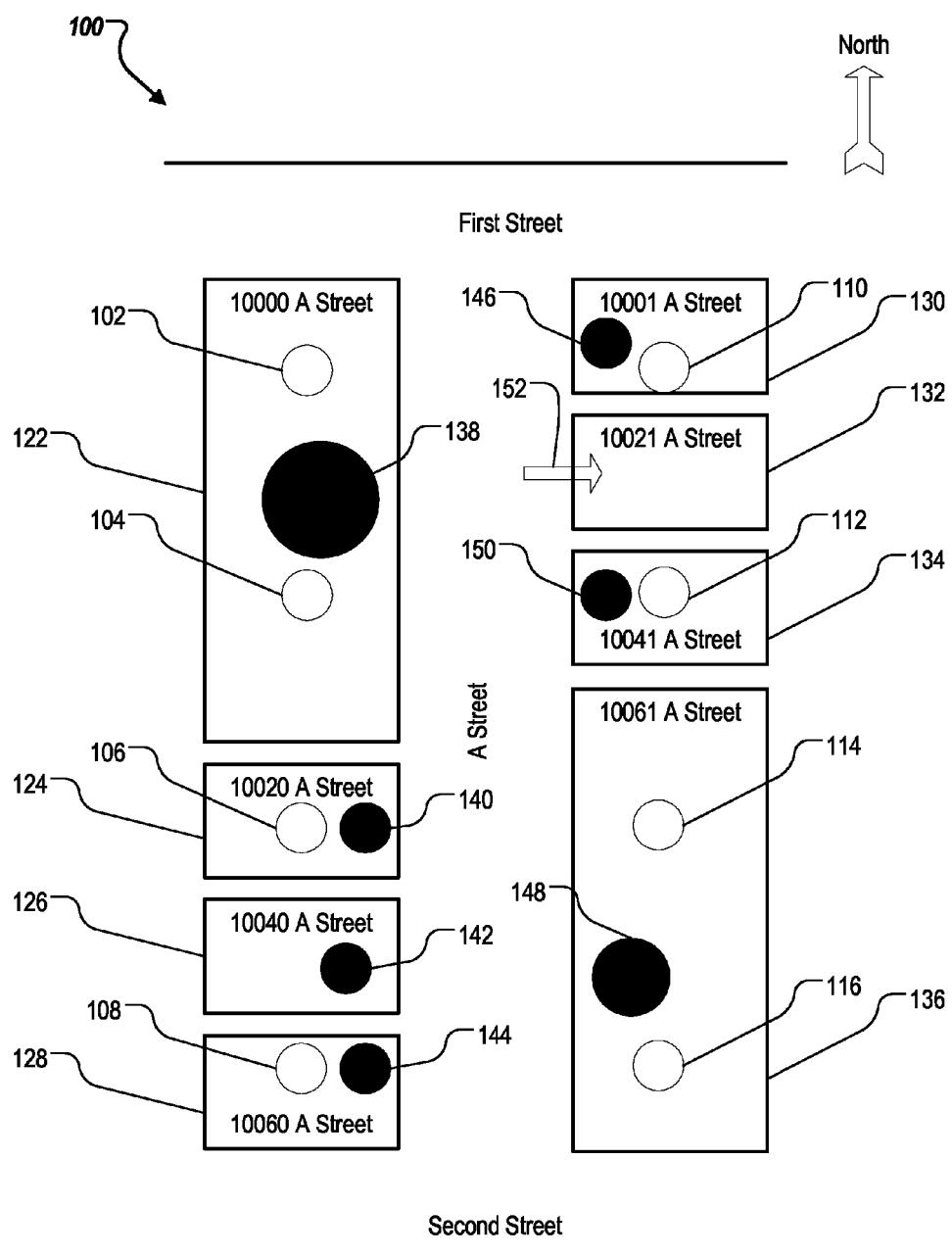
FIG. 1 is a diagram illustrating exemplary techniques of determining geographic coordinates of land features in a street.

FIG. 1 is a diagram illustrating exemplary techniques of determining geographic coordinates of land features in a street. An address point data mining system can provide for display exemplary virtual map 100. Virtual map 100 can include three streets: A Street (going north-south), and cross streets First Street and Second Street, going east-west. The system can determine geographic coordinates (e.g., latitude and longitude coordinates of northwest, northeast, southeast, and southwest corners) that define A Street using geographic data from a map database. For example, the system can determine A Street using TIGER (topological integrated geographic encoding and referencing) data from the U.S. Census Bureau. Using publicly or commercially available data, the system can determine that there are four addresses on each side of A Street, each corresponding to a land feature. The system can determine assumed geographic coordinates of each address using address interpolation.

For example, the system can determine that addresses 10000, 10020, 10040, and 10060, A Street, are located on a west side of A Street in the street block between First Street and Second Street. Using address interpolation, the system can determine locations 102, 104, 106, and 108 based on the northwest point and southwest point of A Street. The system can determine that locations 102, 104, 106, and 108 correspond to addresses 10000, 10020, 10040, and 10060 of A Street, respectively. Each of locations 102, 104, 106, and 108 can be represented in latitude and longitude coordinates, calculated based on the latitude and longitude coordinates of the northwest point and southwest point of A Street. The system can geocode addresses 10000, 10020, 10040, and 10060 of A Street using locations 102, 104, 106, and 108. Likewise, the system geocode addresses 10001, 10021, 10041, and 10061 of A Street using locations 110, 112, 114, and 116. The system can designate the geographic coordinates of locations 102 through 116 as the assumed geographic coordinates of addresses 10000 through 10060 and 10001 through 10061, respectively.

Addresses 10000 through 10061 of A Street may or may not be distributed evenly between First Street and Second Street. For example, address 10000 may correspond to building 122, which can be many times larger than buildings 124, 126, and 128. As a result, the assumed geographic coordinates of addresses 10000, 10020, 10040, and 10060 may not accurately indicate the locations of buildings 122, 124, 126, and 128. Likewise, these assumed geographic coordinates of addresses 10001, 10021, 10041, and 10061 may not accurately indicate the locations of buildings 130, 132, 134, and 136 corresponding to these addresses Using data mined from one or more user devices, the system can determine that one or more user devices on which users registered addresses 10000, 10020, 10040, and 10060 stay at locations 138, 140, 142, and 144, respectively, for a significant amount of time (e.g., more than a threshold number of hours per day or per week). The system can designate locations 138, 140, 142, and 144 as significant locations. Significant locations 138, 140, 142, and 144 can each have an error margin, represented by a radius of the corresponding location in FIG. 1, where a larger radius indicates a larger error margin. The system can crosscheck the assumed geographic coordinates using the significant locations.

For example, the system can determine that one or more user devices that visit significant location 138 have registered address "10000 A Street" with an account (e.g., as billing address). The system can determine that a distance between significant location 138 and assumed geographic coordinates of location 102 (corresponding to address 10000 A Street) is less than a threshold distance of X meters (designated as a "match" threshold distance). Upon this determination, the system can determine that the assumed geographic coordinates of location 112 correctly corresponds to address 10000 A Street. Likewise, the system can determine that significant location 144 is associated with a registered address "10060 A Street." Upon determining that a distance between significant location 144 and location 108 (corresponding to address 10060 A Street) is less than the match threshold distance, the system can determine that the assumed geographic coordinates of location 108 correctly corresponds to address 10060 A Street.

The system can determine that a distance between significant location 140 (associated with address 10020 A Street) and assumed geographic coordinates of location 104 (corresponding to 10020 A Street) is greater than the match threshold but is less than a threshold distance of Y kilometers (designated as a "nearby" threshold distance). Likewise, the system can determine that a distance between significant location 142 and assumed geographic coordinates of location 106 (both corresponding to address 10040 A Street) is greater than the match threshold distance but is less than the nearby threshold distance. Based on the determination, the system can perform additional processing of assumed geographic coordinates of locations 104 and 106, for example, by designating significant locations 140 and 142 as confirmed locations of addresses 10020 and 10040 of A Street.

Likewise, the system can confirm assumed geographic coordinates of location 110 using significant location 146 corresponding to address 10001 A Street, and confirm assumed geographic coordinates of location 116 using significant location 148 corresponding to address 10061 A Street. The system can designate significant location 150 as a confirmed location of address 10041 A Street.

The system may determine that a significant location corresponding to address 10021 A Street cannot be determined, or that a distance between this significant location and assumed geographic coordinates of location 112 (corresponding to 10021 A Street) is greater than the nearby threshold distance. The system can determine a location of 10021 A Street using other operations. For example, the system can perform address interpolation to determine the location of 10021 A Street using a reduced interpolation range. The system can interpolate the location using the locations of two neighbors (e.g., immediate neighbors 10001 and 10041), rather than using the whole block between First Street and Second Street. The reduced interpolation range can result in a more accurate location (e.g., location 152) of address 10021 than location 112, which was determined based on the original address interpolation using the entire block, by removing a distortion caused by the large size of building 136.

Figure 2:
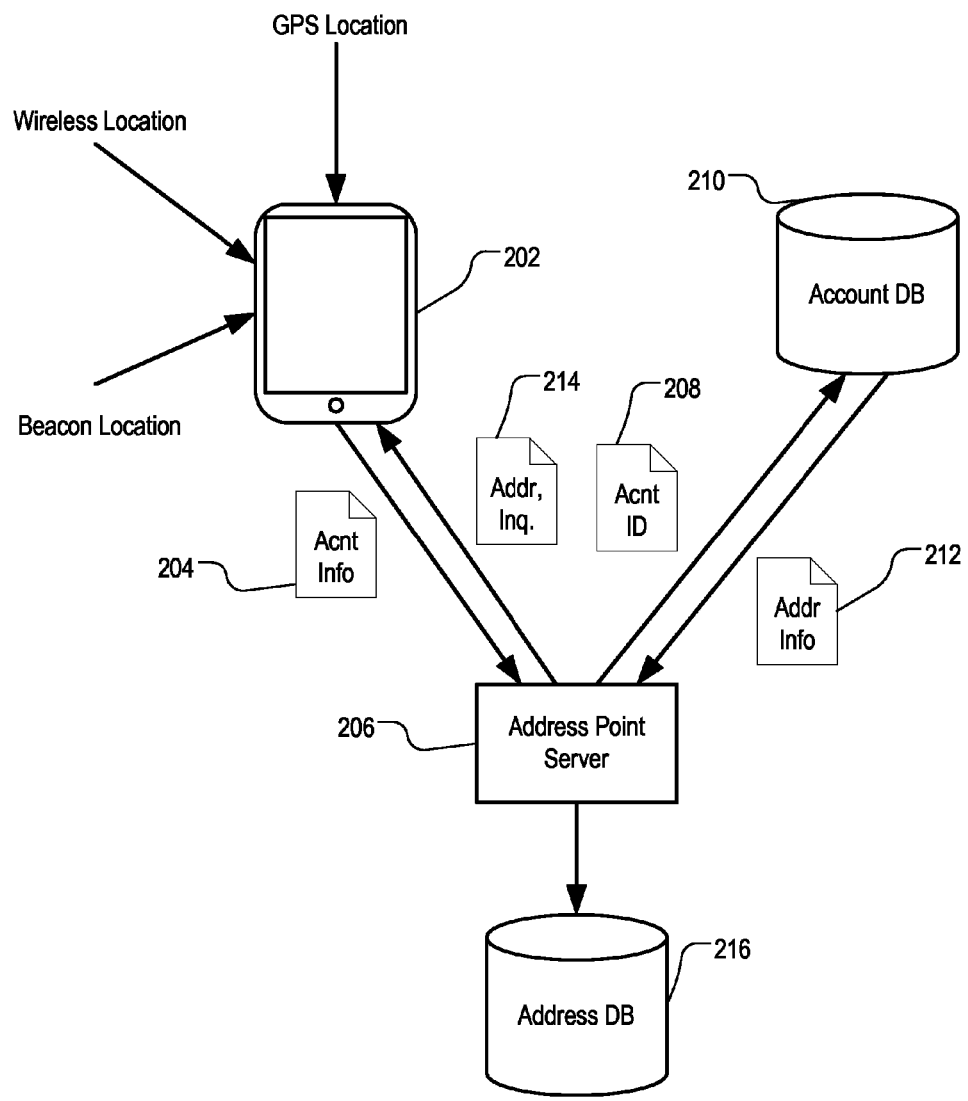
FIG. 2 is a diagram illustrating exemplary interactions between components of an address point mining system.

FIG. 2 is a diagram illustrating exemplary interactions between components of an address point mining system. The address point mining system can include user device 202. User device 202 can be a mobile device (e.g., a laptop or tablet computer, a smart phone, or a wearable electronic device) that can be carried by a person or a vehicle. User device 202 can be configured to determine a location of user device 202 using various techniques. For example, user device 202 can determine a GPS location based on GPS signals, determine a wireless location based on one or more wireless access gateways (e.g., access points or cellular towers), or determine a beacon location based on signals from one or more wireless beacons (e.g., Bluetooth™ Low Energy (BTLE) beacons). User device 202 can determine a location based on any one or any combination of the GPS location, the wireless location, and the beacon location.

User device 202 can determine that a place or region is a significant location upon determining that, with sufficient certainty, mobile device 202 has stayed at the place or region for a sufficient amount of time. User device 202 can store one or more significant locations on a storage device.

Periodically or upon user request, user device 202 can send account information 204 to address point server 206. Address point server 206 can be a component of user device 202, or can be one or more computers coupled to user device 202 through a communications network (e.g., a local or wide area network).

Account information 204 can be an online account name, or an identifier (e.g., a data set identifier) registered online. Upon receiving account information 204, address point server 206 can determine account identifier 208 (e.g., a key value or record identifier in a database) based on account information 204. Address point server 206 can submit account identifier 208 to account database 210 to retrieve address information 212. Account database 210 can store user account information, including, for example, the account identifier, a user name, and one or more registered addresses. Account database 210 can be a component of address point server 206 or a database located remotely from address point server 206.

Address point server 206 can retrieve address information 212 from account database 210 using account identifier 208. Address information 212 can include one or more registered addresses associated with account identifier 208. The registered addresses can include one or more billing addresses, one or more shipping addresses, or any address (e.g., office address or home address). The addresses can be street addresses. Upon receiving address information 212, address point server 206 can provide the representations of the addresses to user device 202 for confirmation. In some implementations, a representation of an address can be the address or an identifier of the address. In some implementations, the identifier can be a unique identifier of the address, for example, a hashed value (e.g., an SHA-2 hash) of the address. In some implementations, address point server 206 can provide the representation of the address to user device 202 one at a time. After providing a representation of a first address, address point server 206 can wait until receiving a next submission of account information 204 from user device 202 to submit a representation of a next address. Address point server 206 can provide representation of the address in association with an assumed location of the address to user device 202 as address inquiry 214. The assumed location can include assumed geographic coordinates determined by geocoding the address using publicly or commercially available geographic information.

Upon receiving address inquiry 214, user device 202 can compare the assumed location with stored significant locations. The comparison can include determining a distance between each significant location and the assumed location. The comparison can have multiple outcomes: match (where the distance is less than or equal to a match threshold), nearby (where the distance is greater than the match threshold but less than or equal to a nearby threshold), or non-match (where the distance is greater than the nearby threshold). User device 202 can submit the result of the comparison to address point server 206 as a response to address inquiry 214. If the result is nearby, user device 202 can submit to address point server 206 one or more significant locations for additional processing.

Upon receiving the result from user device 202, address point server 206 can store the representation of the address in address database 216. Address point server 206 can store the representation of the address in association with a location having latitude, longitude, and optionally, altitude coordinates. In the case where the result is match, address point server 206 can designate the assumed location as confirmed and final, and store the representation of the address in association with the assumed location. In the case where the result is nearby, address point server 206 can determine a location based on the significant locations submitted by user device 202, and store the representation of the address in association with the determined location. In the case where the result is non-match, address point server 206 can mark the representation of the address for further processing (e.g., by using a different geocoding algorithm). Address point server 206 can represent the addresses on a map using the associated locations as stored in address database 216.

In some implementations, address point server 206 can include one or more server computers programmed to perform the operations of confirming the assumed locations. User device 202 can provide one or more significant locations to address point server 206. Upon receiving the significant locations, address point server 206 can compare the received significant locations with an assumed location associated with each registered address, and store results of the comparison in address database 216.

Figure 3:
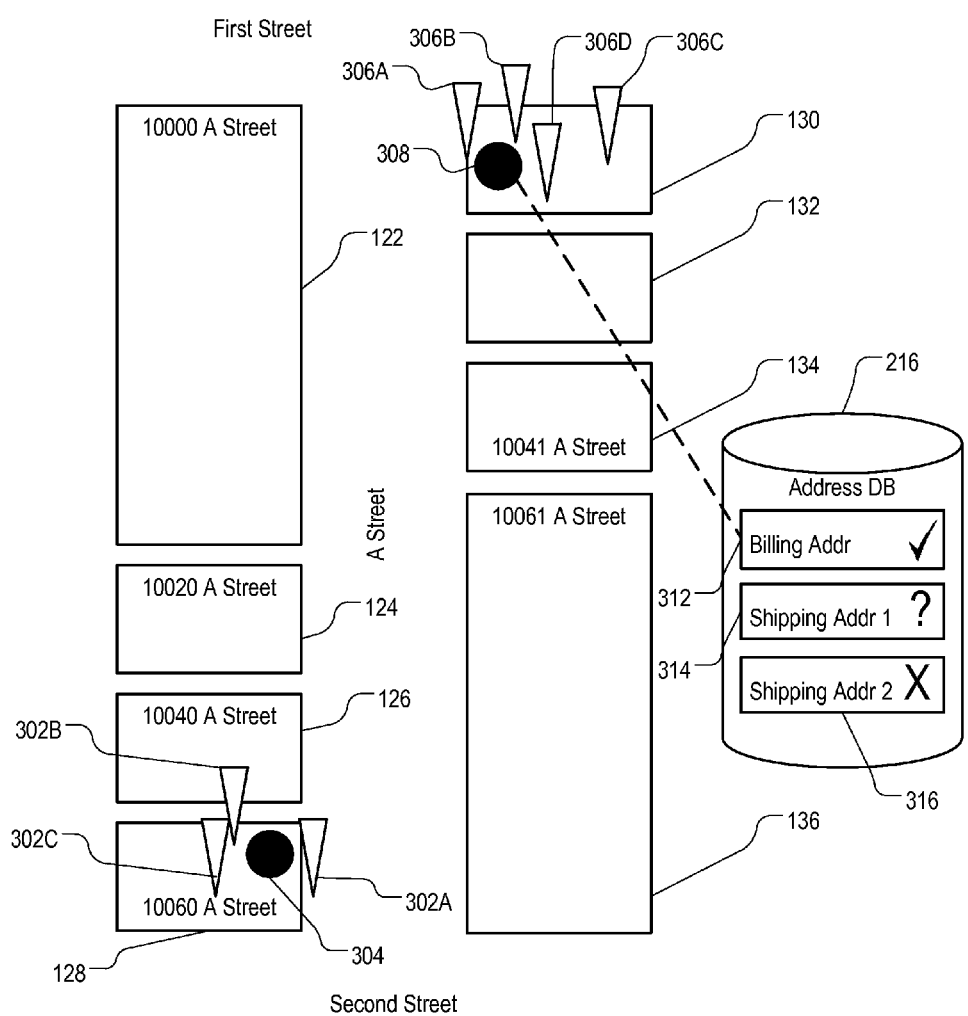
FIG. 3 is a diagram illustrating exemplary techniques confirming geographic coordinates of an address.

FIG. 3 is a diagram illustrating exemplary techniques confirming geographic coordinates of an address. A user device (e.g., user device 202 of FIG. 2) can determine multiple locations 302A, 302B, and 302C, each corresponding a location timestamp (e.g., at noon, at 12:30 pm, and at 1:00 pm, respectively). Based on locations 302A, 302B, and 302C and corresponding location timestamps, the user device can determine first significant location 304. The user device can determine an accuracy of first significant location 304 based on a count of locations 302A, 302B, and 302C and a variance between locations 302A, 302B, and 302C.

In addition, the user device can determine locations 306A, 306B, 306C, and 306D each corresponding to a location timestamp (e.g., 2:00 pm, 2:15 pm, 6:00 pm, and 7:00 pm). The user device can determine second significant location 308 based on locations 306A, 306B, 306C, and 306D and corresponding timestamps.

The user device can submit account information to a server (e.g., address point server 206 of FIG. 2). The server can retrieve addresses associated with the account and store representations of the addresses (e.g., hash values of the addresses) in address records 312, 314, 316 in address database 216. In the example shown, the server retrieves a billing address ("10001 A Street"), a first shipping address (in another part of the city where A Street is located) and a second shipping address (in another city from A Street).

Each time the server receives the account information from the user device, the server can retrieve the addresses and determine whether a retrieved address is stored in an address record in address database 216. Upon determining that an address is already stored, the server can submit a representation of a next not-yet processed address to the user device for confirmation, until all addresses are processed.

In a first iteration, the server can send a representation of a first address (e.g., "10001 A Street" or its hash value) to the user device for confirmation. The representation of the first address can be associated with an assumed location. The user device can determine that a distance between the assumed location and significant location 308 satisfies a match threshold. In response, the user device can submit to the server the representation of the first address (e.g., "10001 A Street" or its hash value), as received from the server, and a match confirmation. The server can then store the representation of the address, in association with the assumed location, in address record 312. The server can designate a status of address record 312 as confirmed. The server can associate a time period (e.g., M months) with address record 312 based on the confirmed status. The time period can indicate when the server will re-confirm the address in address record 312.

In a second iteration, the server can send a representation of a second address (e.g., the first shipping address) to the user device together with an assumed location. The user device can determine that neither significant location 304 nor significant location 308 matches an assumed location of the second address. The user device can determine that a distance between the assumed location and significant location 304 and a distance between the assumed location and significant location 308 both satisfy a nearby threshold. The user device can then submit to the server the representation of the second address, a nearby indicator, and both of significant location 304 and significant location 308. The server can store the representation of the second address in association with a location determined based on (1) the assumed location of the second address, (2) significant location 304, and (3) significant location 308 in address record 314. The server can designate a status of address record 312 as nearby. The server can associate a time period (e.g., N weeks) with address record 314 based on the nearby status.

In a third iteration, the server can send a representation of a third address (e.g., another shipping address) to the user device, together with an assumed location. The user device can determine that neither a distance between the assumed location and significant location 304 nor a distance between the assumed location and significant location 308 satisfies the nearby threshold. The user device can then submit to the server the representation of the third address and a non-match indicator. The server can store the representation of the third address in address record 316. The server can designate a status of address record 312 as unconfirmed. The server can associate a time period (e.g., M months) with address record 316 based on the unconfirmed status.

Figure 4:
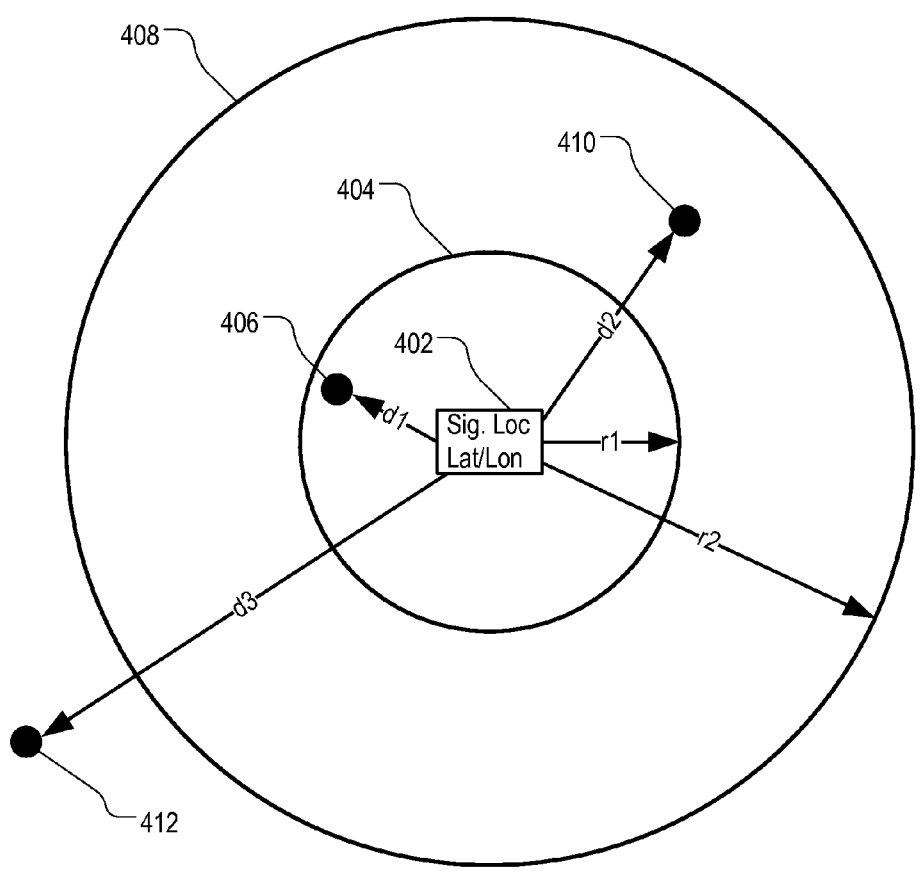
FIG. 4 is a diagram illustrating exemplary thresholds of confirming geographic coordinates of an address.

FIG. 4 is a diagram illustrating exemplary thresholds of confirming geographic coordinates of an address. The confirmation can be based on significant location 402. Significant location 402 can be represented in geographic coordinates (e.g., latitude, longitude, and altitude). Significant location 402 can be associated with a match threshold distance r1. The match threshold distance r1 can define match area 404. The match threshold distance r1 and match area 404 can be defined based on an accuracy of significant location 402 and optionally, a multiplier. For example, when significant location 402 is determined based on fewer locations, or higher variation between the locations, the accuracy of significant location 402 can be lower, the uncertainty of significant location 402 can be higher, and the match threshold distance r1 can be larger.

A user device (e.g., user device 202 of FIG. 2) can determine that assumed location 406 associated with an address matches significant location 402 upon determining that a distance (d1) between assumed location 406 and significant location 402 is no greater than r1. The user device can determine the distance d1 using Euclidean geometry and the latitude and longitude coordinates of assumed location 406 and a centroid of significant location 402. In a three dimensional space, a difference in altitude between assumed location 406 and the centroid of significant location 402 can be used to calculate the distance d1.

Significant location 402 can be associated with a nearby threshold distance r2. The nearby threshold distance r2 can define nearby area 408. The nearby threshold distance r2 can be based on a communication range of a wireless gateway (e.g., a Wi-Fi™ access point or cellular tower) and, optionally, a multiplier. The wireless gateway can be the wireless gateway based on which the user device determined locations for determining significant location 402. When the communication range is higher, the nearby threshold distance r2 can be larger.

A user device (e.g., user device 202 of FIG. 2) can determine that assumed location 410, associated with an address, is nearby to significant location 402 upon determining that a distance (d2) between assumed location 410 and significant location 402 is no greater than r2. The user device can determine the distance d2 using the latitude, longitude, and altitude coordinates of assumed location 410 and significant location 402. The user device can determine that a distance d3 between assumed location 412, associated with an address, and significant location 402 is greater than r2. Accordingly, the user device can determine that assumed location 412 is far away from significant location 402, and is a non-match.

Exemplary System Components

Figure 5:
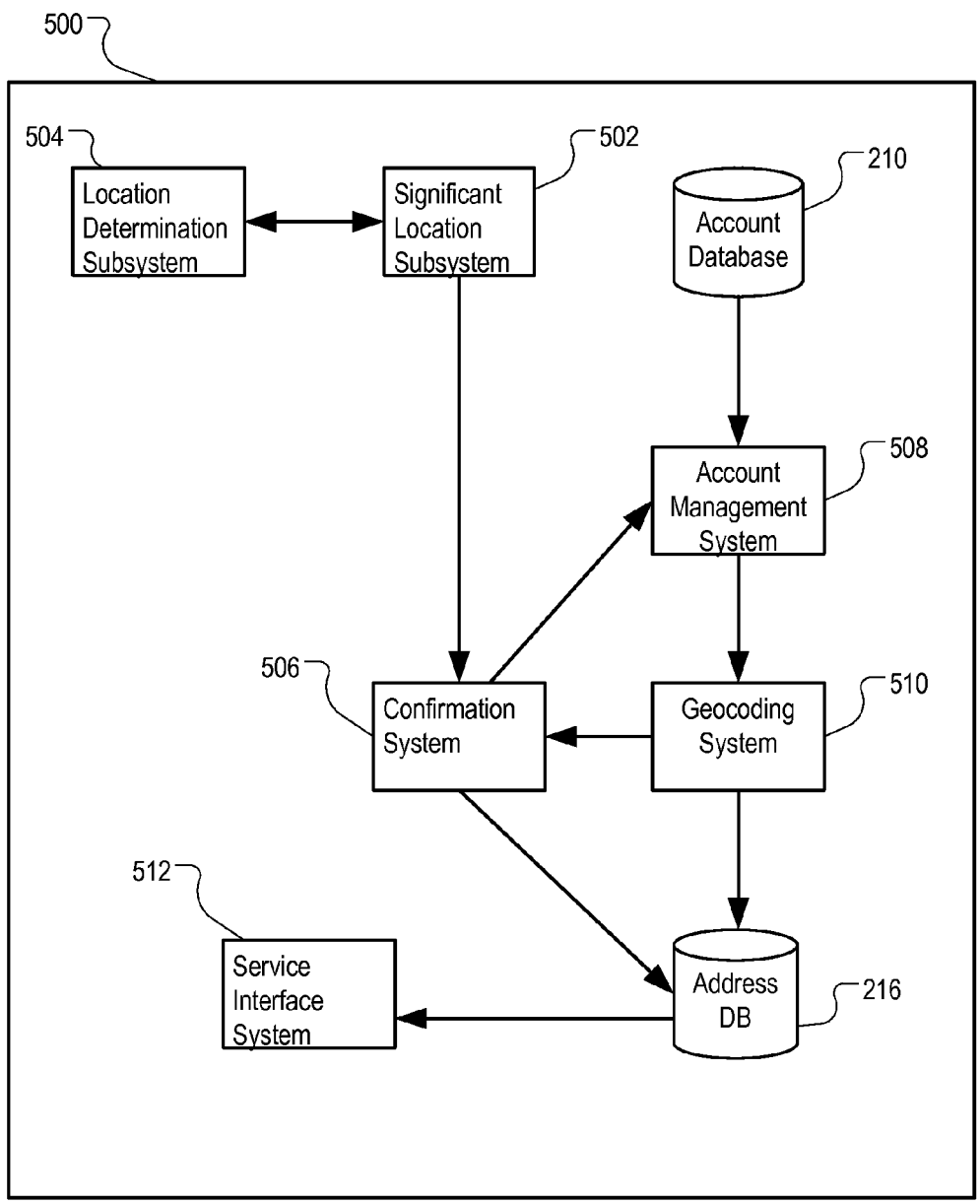
FIG. 5 is a block diagram illustrating exemplary components of an address point data mining system.

FIG. 5 is a block diagram illustrating exemplary components of address point data mining system 500. Each component of system 500 can include hardware and software (or firmware) components. System 500 can include a user device, a server device coupled with a user device, or both.

System 500 can include significant location subsystem 502. Significant location subsystem 502 can be a component of a user device (e.g., user device 202) or a component of a server (e.g., address point server 206) configured to determine one or more significant locations of the user device based on location data from location determination subsystem 504. The location data can include a series of one or more location readings, each being associated with a timestamp. Location determination subsystem 504 can be a component of a user device or a component of a server programmed to determine a location of a user device using a satellite navigation system (e.g., GPS), a cellular communications system (e.g., by triangulation using cellular towers), wireless access gateways (e.g., by triangulation using known access point locations), or radio frequency signal beacons.

A significant location is a location that has been determined to be significant to a user of the user device. A significant location can be a frequent location, which is a location that a user device has stayed for a sufficient amount of time (e.g., X minutes) such that significant location subsystem 502 can determine that there is a sufficiently high probability (e.g., above Y percent) that the user device has visited this location. Significant location subsystem 502 can thus filter out location outliers and location errors (e.g., those caused by poor GPS signal reception).

Significant location subsystem 502 can provide the significant locations to confirmation system 506. Confirmation system 506 can be a component of a user device or a server. Confirmation system 506 can be programmed to submit account information to account management system 508, to receive a representation of an address from geocoding system 510, and to confirm an assumed location of the address using significant locations received from significant location subsystem 502.

Account management system 508 is a component of system 500 configured to receive account information from confirmation system 506, to retrieve one or more addresses associated with an account identified in the account information, and to provide the addresses to geocoding system 510. Geocoding system 510 is a component of system 500 configured to determine an assumed location for each street address. Geocoding system 510 can provide the assumed location to confirmation system 506 in association with the representation of the address for confirmation. Upon confirmation, confirmation system 506 can store the representation of the address in address database 216.

System 500 can include service interface system 512. Service interface system 512 is a component of system 500 configured to provide the address or hash code, and geographic coordinates associated with addresses as stored in address database 216, to various user services. The user services can include, for example, map services, business or residential directory services, or social group services.

Exemplary Procedures

Figure 6A:
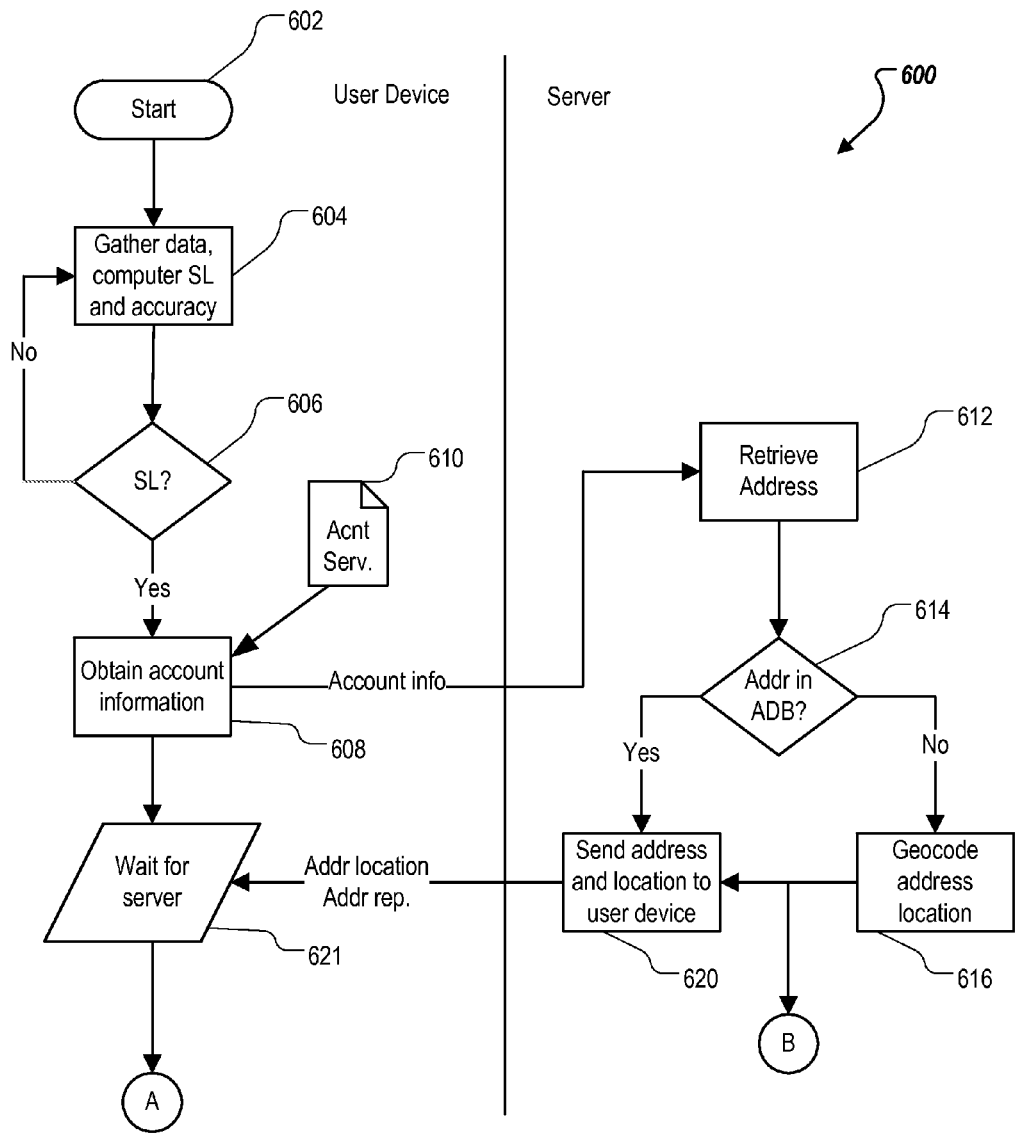
FIGS. 6A and 6B are flowcharts illustrating an exemplary procedure of address point data mining implemented by a user device and a server.
Figure 6B:
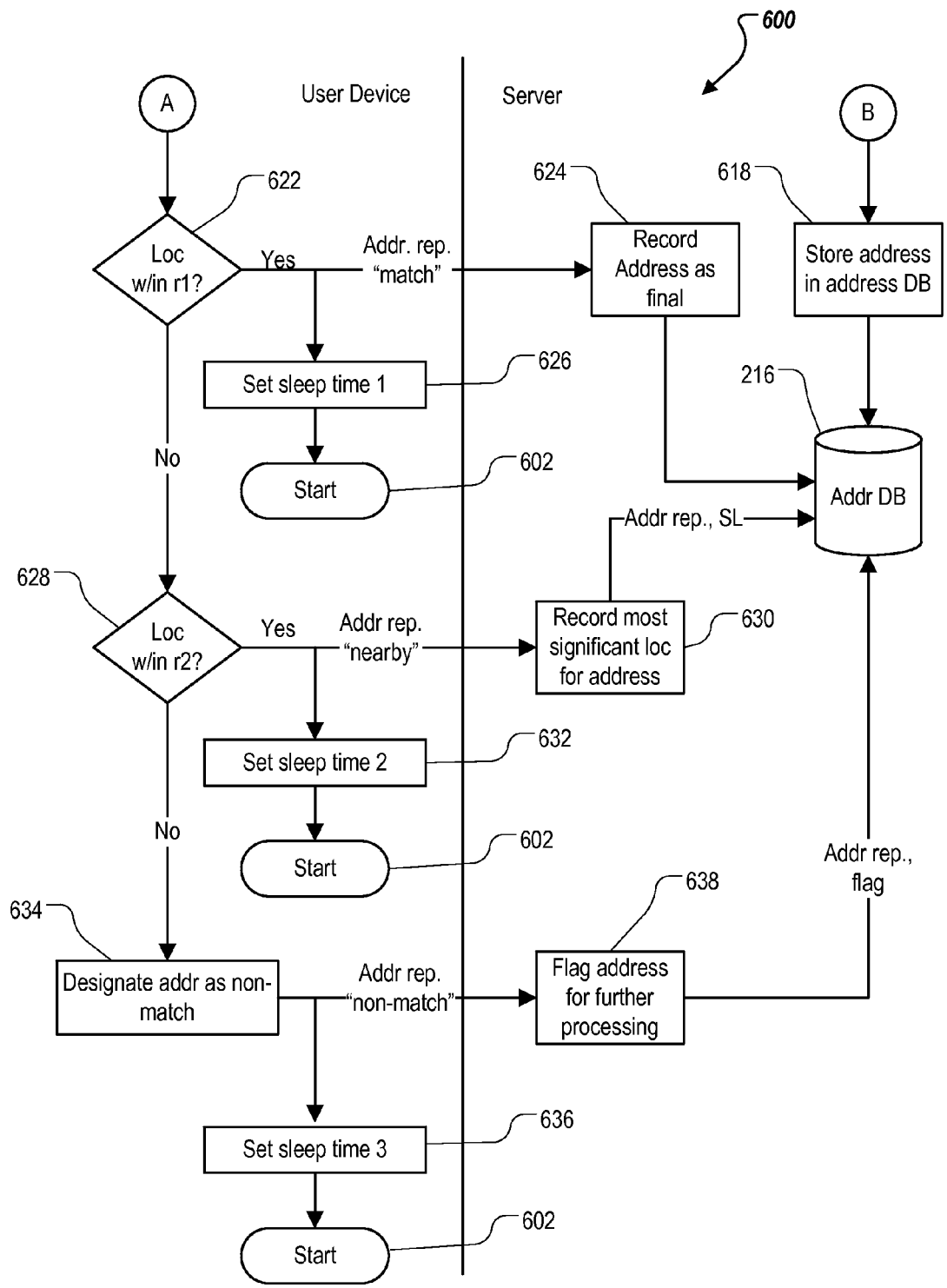

FIGS. 6A and 6B are flowcharts illustrating exemplary procedure 600 of address point data mining implemented by a user device and a server. The user device can be user device 202 of FIG. 2. The server can be server 206 of FIG. 2. The user device and the server can be implemented on a single computing device or on different devices.

A program (e.g., a daemon program) executing on the user device can start (602) procedure 600 upon one or more triggers. The triggers can include a user request or a timer causing the user device to start procedure 600. The user device can gather (604) location data, compute one or more significant locations based on the location data, and determine accuracy of the significant locations. The user device can determine (606) if at least one significant location has been calculated, and perform operations of stage 604 upon determining that at least one significant location has been calculated.

Upon determining that a significant location has been calculated, the user device can obtain (608) account information from account service 610. The account information can include an account identifier (e.g., a data set identifier) and a token for authenticating the identified account. The user device can provide the account information to the server, and wait (621) for a response from the server.

Upon receiving the account information, the server can retrieve (612) one or more addresses associated with the account. Retrieving the addresses can include submitting the account identifier and the token to an authenticating service. Upon authentication the account using the token, the authenticating service can retrieve the one or more addresses. Each address can be a street address including, for example, a street number, a street name, an apartment number or suite number, a city name, a state name, a postal code, and a country name.

The server can determine (614) if the address is in an address database. The address database can be address database 216 of FIG. 2. Upon determining that the address is not in the address database, the server can geocode (616) the address. Geocoding the address can include associating with the address an assumed location including assumed geographic coordinates. The server can store (618 of FIG. 6B) the representation of the address in the address database in association with the assumed location.

Upon determining that the address is already in an address database, or after geocoding the address, the server can send (620) the representation of the address to the user device. The server can send the assumed location in association with the representation of the address.

Upon receiving the representation of the address and the associated assumed location, the user device can determine (622) whether a distance between the assumed location and at least one significant location is within a match threshold distance (r1 of FIG. 4). Upon determining that the distance is within the match threshold distance, the user device can submit the representation of the address to the server in association with an indicator (e.g., "match").

Upon receiving the representation of the address and the indicator, the server can record (624) the assumed location as a final or confirmed location of the address in the address database. The user device can set (626) a first sleep time for a timer. The timer can trigger procedure 600 to start (602) when the first sleep time has elapsed since setting.

Upon determining that the distance is not within the match threshold distance for each significant location, the user device can determine (628) whether the distance satisfy a nearby threshold distance (e.g., r2 of FIG. 4) for at least one significant location. Upon determining that the distance satisfies the nearby threshold distance for one or more significant locations, the user device can send the representation of the address, in association with an indicator (e.g., "nearby"), to the server. The user device can send some or all the significant locations satisfying the nearby threshold distance to the server. In some implementations, the number of significant locations sent can be limited by a pre-defined number N. The user device can send to the server the top N significant locations, ranked based on their respective distances to the assumed location. A significant location that is closer to the assumed location can be ranked higher.

Upon receiving the representation of the address and the significant locations, the server can record (630) a most significant location for the address in the address database. Recording the most significant location can include evaluating geographic coordinates of each significant location successively, based on a significance value assigned to each significant location when the significant location is determined. The server can designate a significant location as an assumed match unless and until the significant location is invalidated. In some implementations, validating or invalidating an assumed matching significant location can include applying other geographic coordinates that have been previously matched to an address. In some implementations, validating or invalidating an assumed matching significant location can include performing spatial calculations based on the significant location and other significant locations or assumed locations.

The user device can set (632) a second sleep time for a timer. The timer can trigger procedure 600 to start (602) when the second sleep time has elapsed since setting. In some implementations, the user device can determine a limit K on number of times to set the second sleep time for the timer. If the user device determines that, for a given address, the number of times of finding a "nearby" condition has exceeded the number K, the user device can set the timer to the first sleep time as described above in reference to stage 626.

Upon determining that a distance between the assumed location and each significant location exceeds the nearby threshold distance, the user device can designate (634) the address as non-match, and send the representation of the address to the server in association with an indicator (e.g., "non-match"). The user device can then set (636) a third sleep time for a timer. The timer can trigger procedure 600 to start (602) when the third sleep time has elapsed since setting. Upon receiving the representation of the address and the indicator, the server can flag (638) the address for additional processing.

Figure 7:
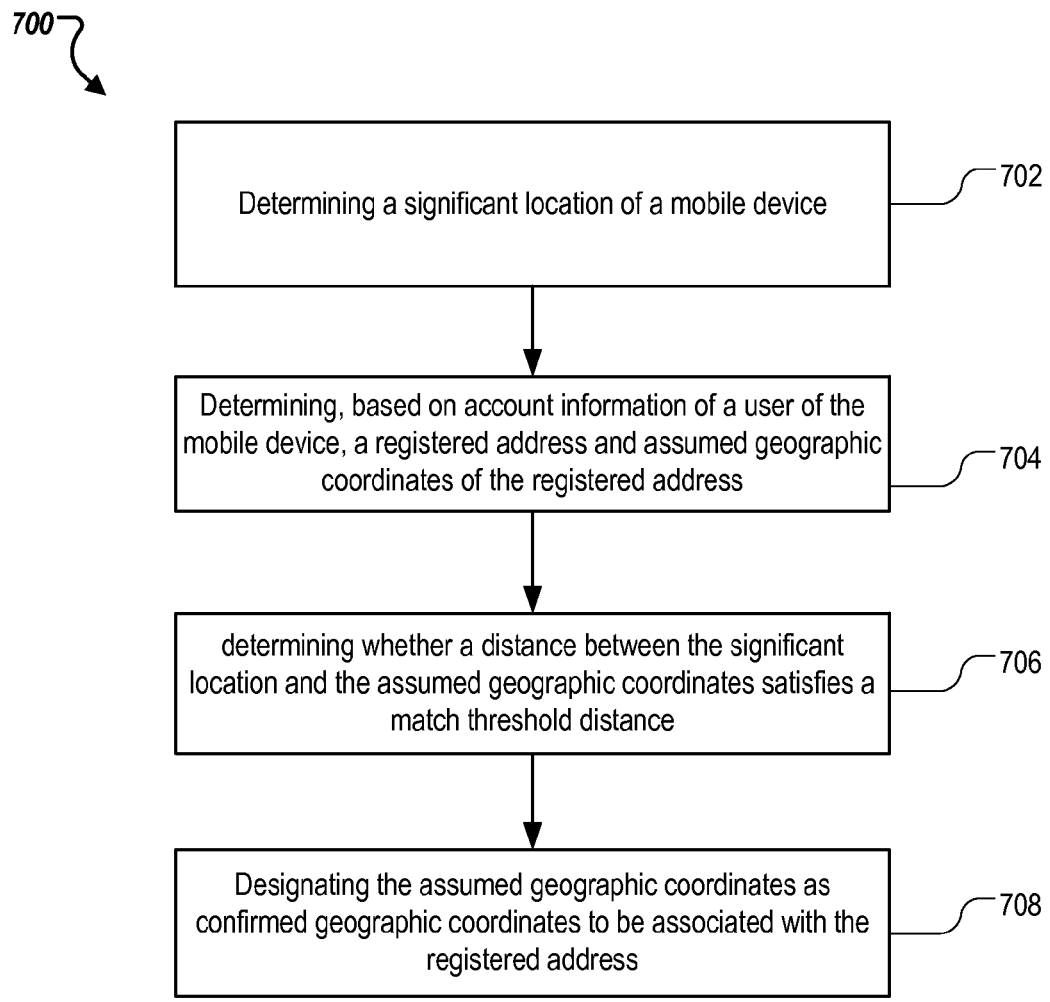
FIG. 7 is a flowchart illustrating an exemplary procedure of address point data mining.

FIG. 7 is a flowchart illustrating an exemplary procedure of address point data mining. Procedure 700 can be performed by a system, e.g., system 500 of FIG. 5, that includes one or more computers.

The system can determine (702) a significant location of a mobile device. The mobile device can be user device 202 of FIG. 2. The significant location can include a geographic location at which the mobile device has stayed for at least a threshold amount of time.

The system can determine (704), based on account information of a user of the mobile device, a registered address and assumed geographic coordinates of the registered address. The account information can include an identifier of an account of the user. The account can be associated with one or more network-based services subscribed by the user. The registered address can include an address associated with the account, e.g., a billing address or a shipping address.

In some implementations, determining the registered address and the assumed geographic coordinates of the registered address can include submitting, by the mobile device, the identifier of the account to a server. The mobile device can then receive, from the server, a representation (e.g., an encrypted key, a hash value, or a unique identifier) of the registered address and the assumed geographic coordinates of the registered address. The system can store the registered address using a unique representation of the registered address in a database record. The representation can include the registered address or an identifier (e.g., a hash value) of the registered address. The assumed geographic coordinates can be geocoded by the server.

The system can determine (706) whether a distance between the significant location and the assumed geographic coordinates satisfies a match threshold distance.

Upon determining that the distance satisfies the match threshold, the system can designate (708) the assumed geographic coordinates as confirmed geographic coordinates to be associated with the registered address. The system can start a timer for triggering determining the significant location in a next iteration. The timer can be configured to trigger the next iteration after a confirmation sleep duration (e.g., the first sleep time as described above in reference to FIG. 6B).

Upon determining that the distance does not satisfy the match threshold distance, the system can determine that the distance satisfies a nearby threshold distance that is larger than the match threshold distance. The system can then validate the significant location based on previously stored significant locations, spatial calculations, or both. The system can designate geographic coordinates of the validated significant location as the confirmed geographic coordinates of the address. After determining that the distance satisfies the nearby threshold, the system can start a timer for triggering determining the significant location in a next iteration. The timer configured to trigger the next iteration after a reconsideration sleep duration (e.g., the second sleep time as described above in reference to FIG. 6B).

Upon determining the distance does not satisfy the nearby threshold distance, the server can designating the assumed geographic coordinates as a non-match. The system can start a timer for triggering determining the significant location in a next iteration, the timer configured to trigger the next iteration after a non-match sleep duration (e.g., the third sleep time as described above in reference to FIG. 6B).

Exemplary Mobile Device Architecture

Figure 8:
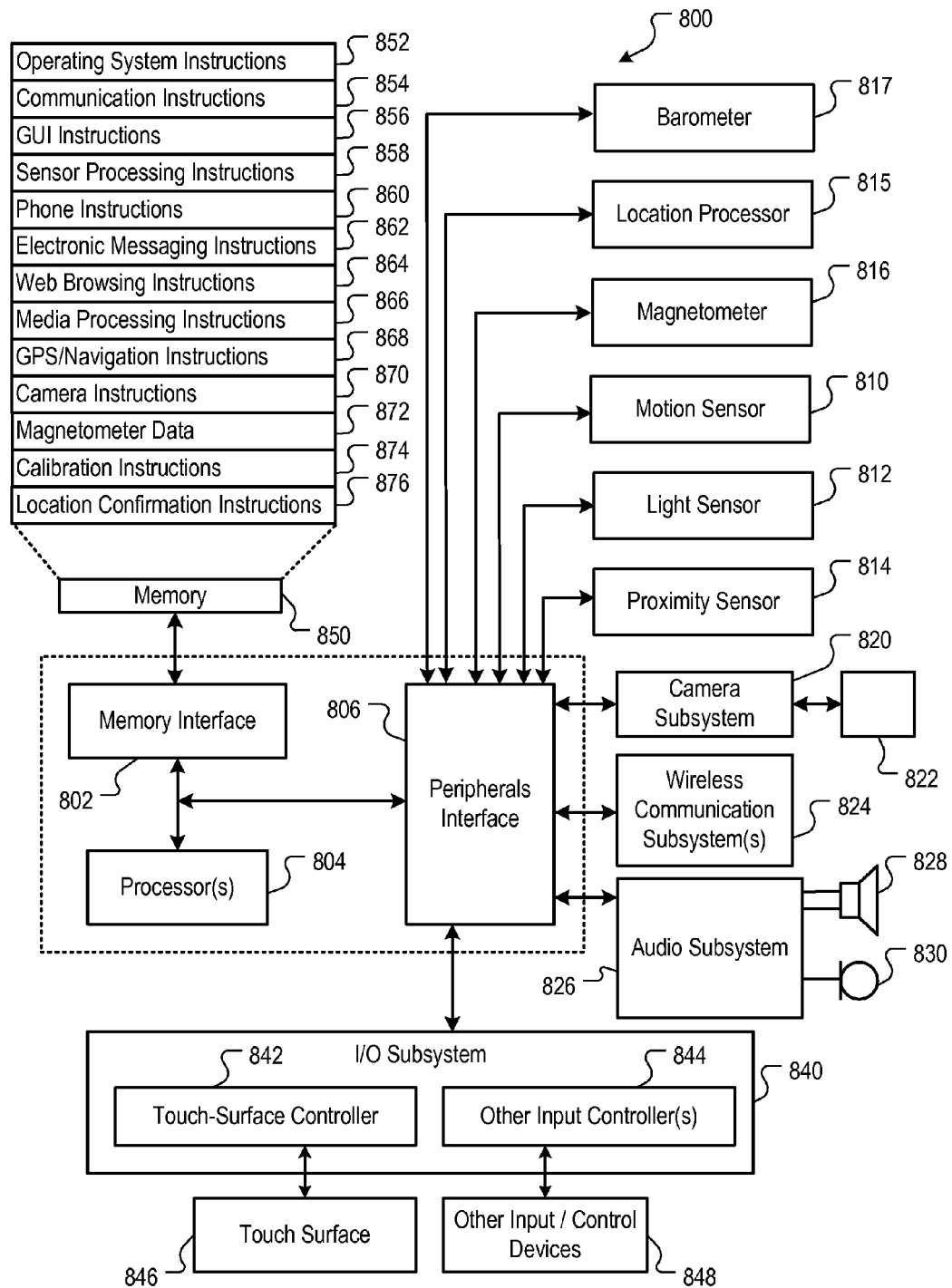
FIG. 8 is a block diagram illustrating an exemplary device architecture of a mobile device implementing the features and operations of FIGS. 1-7.

FIG. 8 is a block diagram illustrating exemplary device architecture 800 of a mobile device implementing the features and operations of FIGS. 1-7. A mobile device (e.g., user device 202 as described in reference to FIGS. 1-7) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in the mobile device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMAX™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, a mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store location confirmation instructions 876. Location confirmation instructions 876, upon execution, can cause processor 804 to perform at least a portion of the operations of procedure 600 (of FIG. 6).

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
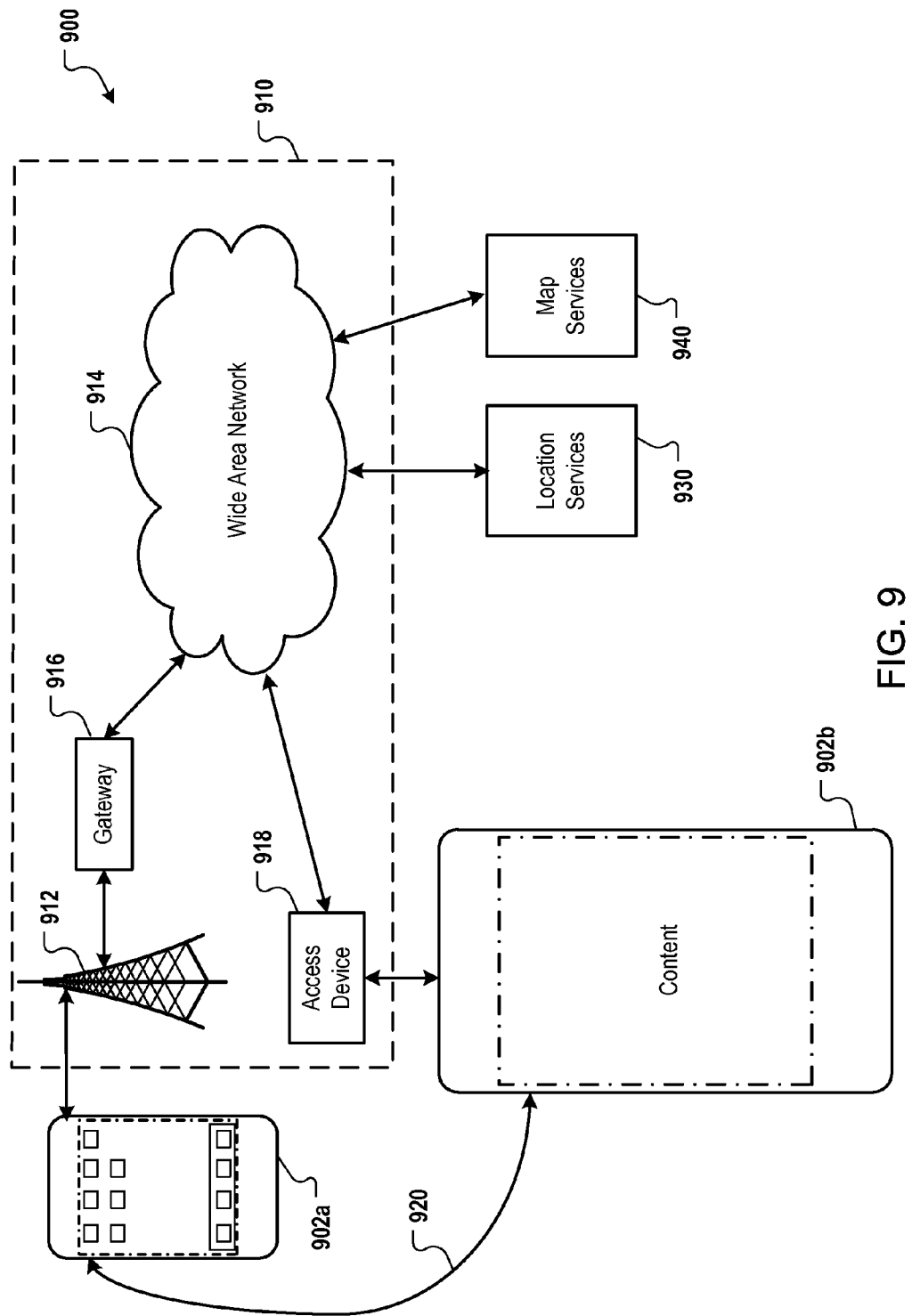
FIG. 9 is a block diagram of an exemplary network operating environment for the mobile devices implementing the features and operations of FIGS. 1-7.

FIG. 9 is a block diagram of exemplary network operating environment 900 for the mobile devices implementing the features and operations of FIGS. 1-7. Each of mobile device 902a and mobile device 902b can be user device 202 as described above. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be a user device as described in FIGS. 1-7.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

Mobile device 902a or 902b can, for example, communicate with one or more services 930 and 940 over the one or more wired and/or wireless networks. For example, one or more location services 930 can provide representations of addresses or and associated assumed locations for confirmation. Map services 940 can provide a virtual map for display. The virtual map can include addresses of land features that are confirmed by a user device.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage.

Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Exemplary System Architecture

Figure 10:
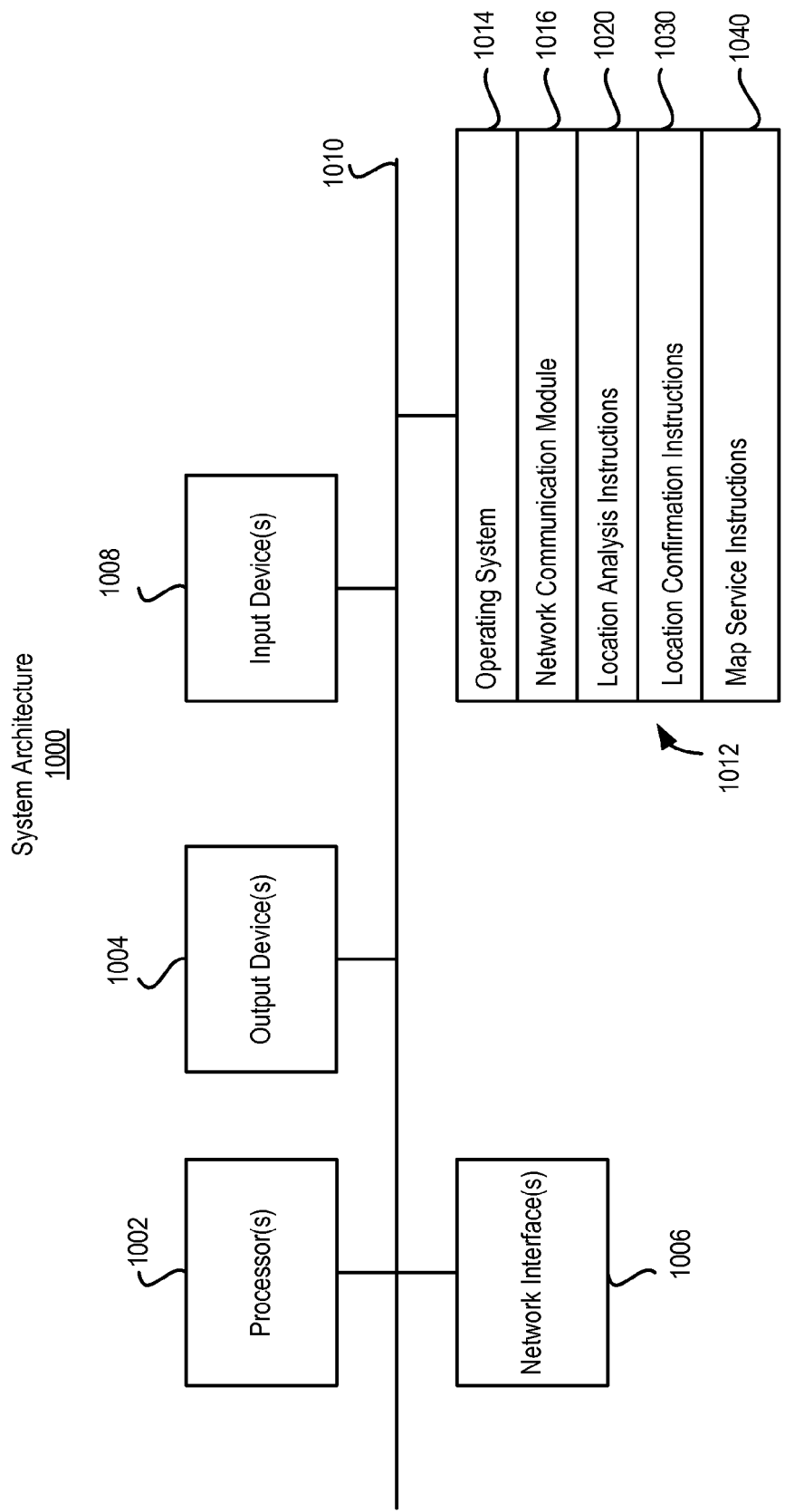
FIG. 10 is a block diagram of an exemplary system architecture for implementing the features and operations of FIGS. 1-7.

FIG. 10 is a block diagram of exemplary system architecture 1000 for implementing the features and operations of FIGS. 1-7. Other architectures are possible, including architectures with more or fewer components. System architecture 1000 can be implemented by server 102 206 of FIG. 2. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, or iOS®), network communication module 1016, location analysis instructions 1020, location confirmation instructions 1030, and map service instructions 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Location analysis instructions 1020 can include instructions that, when executed, causes processor 1002 to perform operations of significant location subsystem 502 as described above in reference to FIG. 5. Location confirmation instructions 1030 can include instructions that, when executed, causes processor 1002 to perform server-side operations procedure 600 as described above in reference to FIGS. 6A and 6B. Map service instructions 1040 can include instructions that, when executed, causes processor 1002 to provide map information to user devices. The map information can include confirmed locations of street addresses.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
   determining a location of a mobile device;
   determining, based on account information of a user of the mobile device, an address associated with the user;
   determining assumed geographic coordinates of the address;
   confirming that the assumed geographic coordinates indicate a geographical location of the address in response to determining that a plurality of conditions have been satisfied, the plurality of conditions including:
      a first condition that the location of the mobile device is designated as a significant location of the user, wherein the mobile device designates the location of the mobile device as the significant location upon determining that, according to a series of location readings, the mobile device stayed for more than a threshold amount of time at the location; and
      a second condition that a distance between the significant location and the assumed geographic coordinates satisfies a match threshold distance that corresponds to a count of the location readings in the series, wherein a lower count corresponds to a larger match threshold distance; and
   upon the confirming, storing the assumed geographic coordinates in association with the address,
   wherein the method is performed by one or more computing devices.

2. The method of claim 1, wherein:
   the account information comprises an identifier of an account of the user, the account being associated with one or more network-based services subscribed by the user, and
   the address includes an address associated with the account.

3. The method of claim 2, wherein the assumed geographic coordinates of the address include geocoded geographic coordinates determined using address interpolation.

4. The method of claim 2, wherein determining the assumed geographic coordinates of the address comprises:
   submitting, by the mobile device, the identifier of the account to a server; and
   receiving, by the mobile device and from the server, a representation of the assumed geographic coordinates of the address, wherein the assumed geographic coordinates are geocoded by the server.

5. The method of claim 1, comprising:
   after determining the distance satisfies the match threshold distance, starting a timer for triggering determining the significant location in a next iteration, the timer configured to trigger the next iteration after a confirmation sleep duration.

6. The method of claim 1, comprising, upon determining the distance does not satisfy the match threshold distance:
   determining that the distance satisfies a nearby threshold distance, the nearby threshold distance being a distance that is larger than the match threshold distance; then
   validating the significant location based on at least one of spatial calculations or previously stored significant locations; and
   designating geographic coordinates of the validated significant location as confirmed geographic coordinates.

7. The method of claim 6, comprising, after determining that the distance satisfies the nearby threshold distance, starting a timer for triggering determining the significant location in a next iteration, the timer configured to trigger the next iteration after a reconsideration sleep duration.

8. The method of claim 1, comprising, upon determining the distance does not satisfy a nearby threshold distance that is greater than the match threshold distance:
   designating the assumed geographic coordinates as a non-match; and
   starting a timer for triggering determining the significant location in a next iteration, the timer configured to trigger the next iteration after a non-match sleep duration.

9. The method of claim 1, wherein the one or more computing devices comprise one or more server devices.

10. A system comprising:
    one or more computing devices; and
    a non-transitory storage device storing computer instructions operable to cause the one or more computing device to perform operations comprising:
       determining a location of a mobile device;
       determining, based on account information of a user of the mobile device, a address associated with the user;
       determining assumed geographic coordinates of the address;
       confirming that the assumed geographic coordinates indicate a geographical location of the address in response to determining that a plurality of conditions have been satisfied, the plurality of conditions including:

a first condition that the location of the mobile device is designated as a significant location of the user, wherein the mobile device designates the location of the mobile device as the significant location upon determining that, according to a series of location readings, the mobile device stayed for more than a threshold amount of time at the location; and a second condition that a distance between the significant location and the assumed geographic coordinates satisfies a match threshold distance that corresponds to a count of the location readings in the series, wherein a lower count corresponds to a larger match threshold distance; and upon the confirming, storing the assumed geographic coordinates in association with the address.

11. The system of claim 10, wherein:
the account information comprises an identifier of an account of the user, the account being associated with one or more network-based services subscribed by the user, and
the address includes an address associated with the account.

12. The system of claim 11, wherein determining the location of the mobile device comprises receiving the location of the mobile device from the mobile device.

13. The system of claim 11, wherein determining the assumed geographic coordinates of the address comprises:
submitting, by the mobile device, the identifier of the account to a server; and
receiving, by the mobile device and from the server, a representation of the assumed geographic coordinates of the address, wherein the assumed geographic coordinates are geocoded by the server.

14. The system of claim 10, the operations comprising:
after determining the distance satisfies the match threshold distance, starting a timer for triggering determining the significant location in a next iteration, the timer configured to trigger the next iteration after a confirmation sleep duration.

15. The system of claim 10, the operations comprising, upon determining the distance does not satisfy the match threshold distance:
determining that the distance satisfies a nearby threshold distance, the nearby threshold distance being a distance that is larger than the match threshold distance; then
validating the significant location based on at least one of spatial calculations or previously stored significant locations; and
designating geographic coordinates of the validated significant location as confirmed geographic coordinates.

16. The system of claim 15, the operations comprising, after determining that the distance satisfies the nearby threshold distance, starting a timer for triggering determining the significant location in a next iteration, the timer configured to trigger the next iteration after a reconsideration sleep duration.

17. The system of claim 10, the operations comprising, upon determining the distance does not satisfy a nearby threshold distance that is greater than the match threshold distance:
designating the assumed geographic coordinates as a non-match; and
starting a timer for triggering determining the significant location in a next iteration, the timer configured to trigger the next iteration after a non-match sleep duration.

18. The system of claim 10, wherein the one or more computing devices comprise one or more server devices.

19. A non-transitory storage device storing computer instructions operable to cause one or more computing device to perform operations comprising:
determining a location of a mobile device;
determining, based on account information of a user of the mobile device, an address associated with the user;
determining assumed geographic coordinates of the address;
confirming that the assumed geographic coordinates indicate a geographical location of the address in response to determining that a plurality of conditions have been satisfied, the plurality of conditions including:
a first condition that the location of the mobile device is designated as a significant location of the user, wherein the mobile device designates the location of the mobile device as the significant location upon determining that, according to a series of location readings, the mobile device stayed for more than a threshold amount of time at the location; and
a second condition that a distance between the significant location and the assumed geographic coordinates satisfies a match threshold distance that corresponds to a count of the location readings in the series, wherein a lower count corresponds to a larger match threshold distance; and
upon the confirming, storing the assumed geographic coordinates in association with the address.

20. The non-transitory storage device of claim 19, wherein:
the account information comprises an identifier of an account of the user, the account being associated with one or more network-based services subscribed by the user, and
the address includes an address associated with the account.

21. The non-transitory storage device of claim 20, the operations comprising storing the address using a representation of the address in a database record.

22. The non-transitory storage device of claim 20, wherein determining the assumed geographic coordinates of the address comprises:
submitting, by the mobile device, the identifier of the account to a server; and
receiving, by the mobile device and from the server, a representation of the assumed geographic coordinates of the address, wherein the assumed geographic coordinates are geocoded by the server.

23. The non-transitory storage device of claim 19, the operations comprising:
after determining the distance satisfies the match threshold distance, starting a timer for triggering determining the significant location in a next iteration, the timer configured to trigger the next iteration after a confirmation sleep duration.

24. The non-transitory storage device of claim 19, the operations comprising, upon determining the distance does not satisfy a nearby threshold distance, the nearby threshold distance being a distance that is greater than the match threshold distance:
determining that the distance satisfies a nearby threshold distance that is larger than the match threshold distance; then
validating the significant location based on at least one of spatial calculations or previously stored significant locations; and designating geographic coordinates of the validated significant location as confirmed geographic coordinates.

25. The non-transitory storage device of claim 24, the operations comprising, after determining that the distance satisfies the nearby threshold distance, starting a timer for triggering determining the significant location in a next iteration, the timer configured to trigger the next iteration after a reconsideration sleep duration.

26. The non-transitory storage device of claim 19, the operations comprising, upon determining the distance does not satisfy a nearby threshold distance:
   designating the assumed geographic coordinates as a non-match; and
   starting a timer for triggering determining the significant location in a next iteration, the timer configured to trigger the next iteration after a non-match sleep duration.

27. The non-transitory storage device of claim 19, wherein the assumed geographic coordinates of the address include geocoded geographic coordinates determined using address interpolation.

\* \* \* \* \*